Patented Oct. 5, 1943

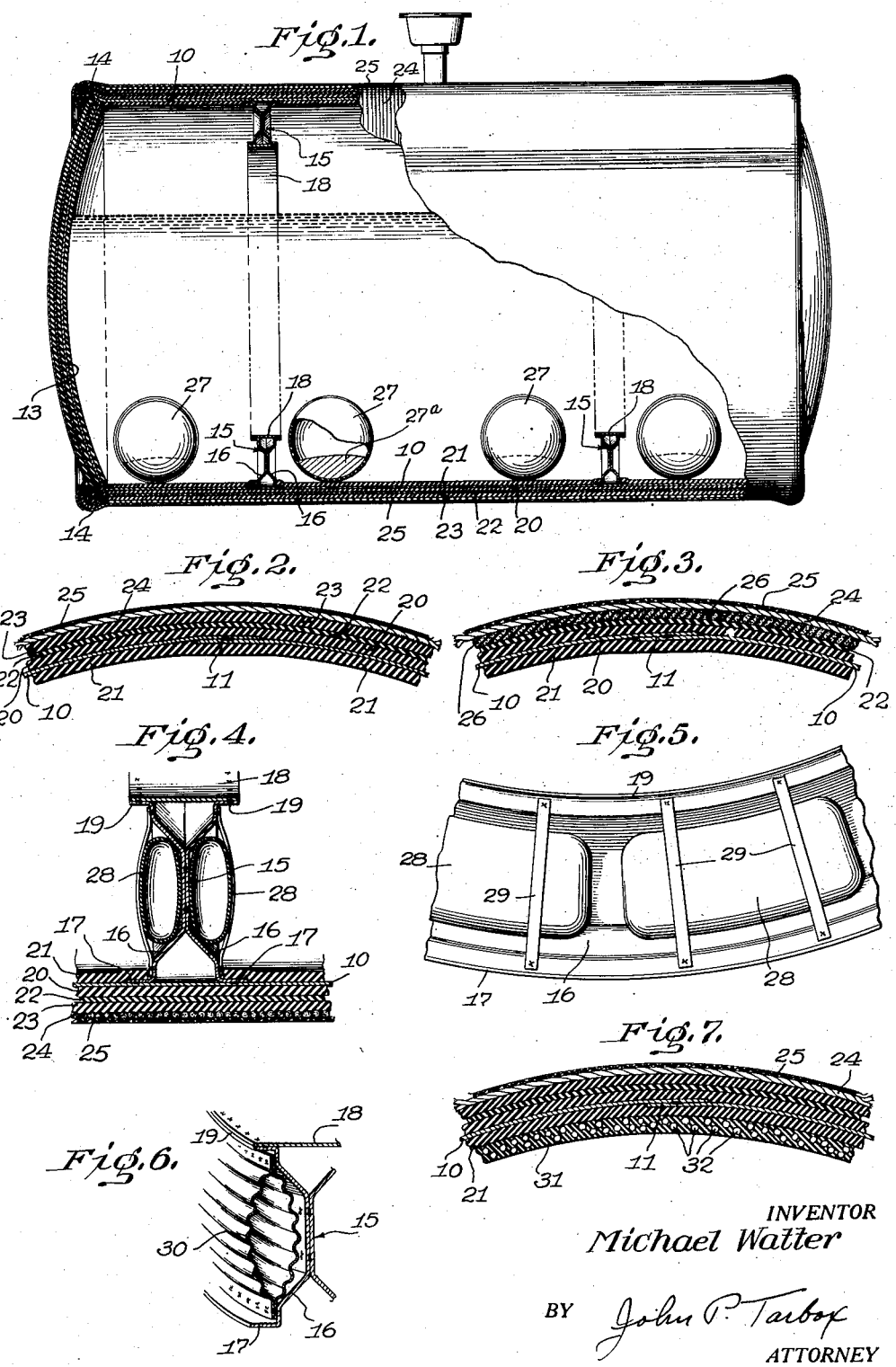

2,331,097

UNITED STATES PATENT OFFICE 2,331,097

LIQUID RECEPTACLE

Michael Watter, Philadelphia, Pa., assignor to Edward G. Budd Manufacturing Company, Philadelphia, Pa., a corporation of Pennsylvania Application April 11, 1941, Serial No. 388,047

6 Claims. (Cl. 137—21)

This invention relates to self-sealing tanks, particularly to tanks for holding fuel or other liquids, and to means for absorbing abnormal transient pressures which may be developed within the tank.

Fuel tanks, particularly for aircraft, have been developed in the past which are self-sealing when ruptured, for example, by the penetration of bullets or other objects through the walls thereof. It has been the usual practice to employ ordinary rubber which, unfortunately, while possessing many of the necessary properties, is not immune to the disintegrating effects of, or solvent action of, oil, gasoline, and the like.

While self-sealing tanks do have the property of automatically resealing openings which may be formed by the penetration of bullets, shell fragments or other missiles, such tanks, of themselves, are not capable of withstanding extremely high transient pressures developed by the passage of high-speed bullets therethrough. A high-speed bullet produces a substantially instantaneous pressure wave when it encounters the liquid in the tank, which is frequently of such magnitude that, due to the fact that the liquid is not compressible, it bursts or cracks the tank completely, not only ruining the tank but also causing such damage that the pilot loses control of the aircraft.

Accordingly, the present invention has for one of its objects the provision of self-sealing coverings for liquid-containing tanks which are as nearly as possible resistant to the solvent action of hydrocarbons and the like, and which are of a material known as "synthetic rubber."

Another object is to provide a liquid-containing tank with internal means capable of absorbing abnormal transient pressures which are developed by the passage of missiles at high speed through the tank and liquid, whereby to prevent rupture of the tank.

A further object is to provide a liquid-containing tank with one or more flexible gas-filled bodies located within the tank, which bodies are of such character that the walls thereof, when subjected to abnormal transient pressures within the tank, flex to compress the surrounded gas and thereby absorb such pressures.

With the above and other objects in view, the present invention consists of certain features of construction and combinations of parts to be hereinafter described with reference to the accompanying drawing and then claimed.

In the drawing, which illustrates suitable embodiments of the invention:

Figure 1 is a side elevation of a liquid fuel tank for aircraft in which the present invention is incorporated, portions of the tank being broken away and shown in section;

Figure 2 is an enlarged fragmentary transverse sectional view of the tank taken through the lap seam of the steel shell;

Figure 3 is a view similar to Figure 2, showing one of the outer walls formed of sponge-like rubber;

Figure 4 is an enlarged sectional view of a portion of the tank of Figure 1, showing one of the annular reinforcements and means associated therewith for absorbing abnormal transient pressures;

Figure 5 is a fragmentary side elevation of the annular tank reinforcement shown in Figure 4;

Figure 6 is a fragmentary perspective view of one of the tank reinforcements, showing a modified form of pressure-absorbing means associated therewith; and Figure 7 is a section similar to the section of Figure 2 of a modified wall construction for the tank.

Referring to the accompanying drawing in which like numerals refer to like parts throughout the several views, there is shown for the purpose of illustration a fuel tank suitable for use in aircraft, the tank being of circular cross-section, although it is to be clearly understood that it may be of any desired cross-sectional shape. The tank shown in the drawing is preferably constructed of sheet stainless steel having a cylindrical body portion formed from a single sheet 10, the ends of which are overlapped and seam welded, as shown at 11 in Figure 2, and dome-shaped ends 13. The ends of the sheet 10 and the peripheries of the ends 13 are provided with attaching flanges 14 which are seam welded to provide a liquid-tight joint therebetween.

Preferably, baffles or annular reinforcements 15 of suitable configuration are provided within the tank, and as here shown, comprise annular channel-shaped members 16 secured together in back-to-back relation. As shown more clearly in Figure 4, the radially outer flanges 17 of the channel members are welded to the sheet 10 which forms the cylindrical body of the tank. A sheet metal band 18 fits within the inner flanges 19 of the channel members 16 and is securely welded thereto to provide additional rigidity for the structure.

As previously stated, attempts have been made to provide a self-sealing tank by the use of ordinary rubber, which, however, is objectionable due to the solvent action of gasoline and the like on the rubber. The present invention contemplates the use of synthetic rubber such as "Neoprene," which will not be affected by the solvent action of gasoline or other fuels or oils.

The self-sealing feature of the tank is provided by layers of synthetic rubber. In one form of the invention, a sheet 20 of solid synthetic rubber, as shown in Figure 2, is vulcanized to the outside of the steel sheet 10, and a similar sheet 21 of solid synthetic rubber is vulcanized to the inside surface of the sheet 10.

In order to improve the protection provided by the synthetic rubber, it is preferred to have the outer sheet 20 extend completely around the outside of the cylinder provided by the metal sheet 10. Surrounding the sheet 20 in intimate relation is a layer 22 of unvulcanized synthetic rubber gum; that is, a viscid yieldable semi-plastic mass which may flow to a certain extent when necessary. A further layer 23 of synthetic rubber in turn surrounds the gum layer 22 and confines it against loss. This second layer of synthetic rubber may, if desired, be wound tightly with one or more layers of cord 24, which in turn is covered with fabric 25 and shellacked or varnished. By tightly winding the cord 24 around the layer 23, the layer of synthetic gum is compressed between the layers 20 and 23 so that, in the event of puncture of one of these layers, the gum will readily flow into the opening left thereby.

In a slightly modified form illustrated in Figure 3, the layers of synthetic rubber are in substantially the same relationship as shown in Figure 2 except that the outermost layer 23 is replaced by a layer 26 of sponge-like synthetic rubber. Synthetic rubber in the form of neoprene is employed because it is not affected by the solvent action of the fuel. Therefore, it will be understood that other rubber-like materials may be substituted for the neoprene provided that they have this characteristic of withstanding solvent action of gasoline and oil.

It is also preferable to provide the ends 13 of the tank with inner and outer layers of the synthetic rubber of substantially the same order as employed in connection with the cylindrical body 10.

A bullet entering the structure will first probably sever one or more of the cords surrounding the tank, and for this reason the outer layer of shellacked or varnished fabric is provided to prevent the possibility of unraveling of the cord. It is obvious that the fabric will hold the parted ends of the cords in place. The bullet next penetrates the layer 23 of synthetic rubber and thereafter passes in turn through the layer 22 of synthetic gum and the layer 20 of solid synthetic rubber immediately adjacent the stainless steel sheet 10. Thereafter, the bullet penetrates the stainless steel sheet and the inner lining 21 of solid synthetic rubber, whereupon, if it still has sufficient energy, it will penetrate the opposite wall of the tank, passing out through the various layers in an order which is the reverse of that just given.

Solid synthetic rubber, after a bullet passes through the same, tends immediately to close the opening, and in some cases may be of sufficient protection to prevent loss of the fuel. However, added safety is provided by the layer 22 of synthetic gum between the two layers of solid synthetic rubber. Since the synthetic gum is sufficiently semi-plastic to readily flow into the openings formed by the bullet, it completely seals the openings left by the bullet. The inner layer of solid synthetic rubber also tends to seal the openings produced by the puncture. It thus will be seen that the tank of the present invention is well protected by a multiplicity of separate layers of self-sealing synthetic rubber.

The winding of the cord 24 tightly about the outer layer tends to readily compress the layers with the result that it exerts a pressure on the intermediate layer of synthetic gum, which forces the gum rubber to flow into openings formed in the other layers, whereby it completely seals the openings in the relatively harder layers of synthetic rubber.

As previously set forth, it is well known that, when a bullet passes through a liquid fuel tank, an instantaneous high-pressure wave is set up, upon contact of the high-speed bullet with the liquid, which in many cases is of such magnitude that it causes the tank to burst. The reason for this action presumably lies in the incompressibility of liquids in general, thus causing them to transmit high pressures to the walls of the tank.

The present invention further contemplates the provision of readily compressible elements submerged within the liquid which are adapted to absorb these abnormal transient pressures. Various means of absorbing these pressures may be employed. For example, as shown in Figure 1, a plurality of hollow balls, containing air at atmospheric pressure or a non-combustible gas, may be provided and held in submerged position in any suitable manner beneath the surface of the liquid in the tank. These balls may be of synthetic rubber or any other material resistant to the solvent action of the gasoline or other fuels or oils and are of such thin-walled structure that they will readily compress when subjected to pressure. Various means may be employed for holding balls 27 submerged in the liquid. One such means, as shown in Figure 1, is to provide the balls with internal weights 27a sufficient to overcome the buoyancy of the balls.

In another form, the pressure-absorbing means may take the form of elongated sealed sacks 28 of flexible material containing gas at atmospheric pressure, which may be mounted as shown in Figures 4 and 5 by means of retaining strips 29 welded to the reinforcing members 15, the sacks 28 being disposed within the channel members 16. Any desired number of sacks 28 may be employed so that, in the case of rupture of one sack, others will be present to absorb the abnormal transient pressures. These may be associated with one or both sides of the reinforcing members 15.

In another form of the invention, the pressure-absorbing means may take the form of annular flexible diaphragms 30 of thin metal welded together around their inner and outer peripheries to provide a closed gas-filled chamber, which members may be secured in place by welding within the bases of the channels 16, as shown in Figure 6. As in the previous case, any desired number of flexible diaphragm members may be employed.

Referring to Figure 7, there is indicated at 31 a fragment of an inner lining which may be placed inside the sheet 21 of synthetic rubber. This lining is made of synthetic rubber having a relatively larger part of its volume composed of individually sealed gas bubbles 32. This material differs from sponge rubber of the ordinary variety in the important characteristic that the bubbles constitute individual cells which are separated from each other. In the present example, a suitable material would be synthetic rubber, the gas cells representing the major part of its volume. A sheet of such material may, for example, extend entirely around the inner surface of the cylindrical part of the tank and, if desired, at the ends, thus affording an air cushion which, when encountered by a pressure wave of high magnitude, will yield sufficiently to save the metal sheet 10 from destruction or rupture.

Therefore, in accordance with the present invention, initial protection is provided by employing resilient devices within the fuel tank such as the hollow balls, the lining if synthetic rubber, the elongated sacks, or the flexible diaphragms described. Each of these protective devices has the effect of providing a collapsible yieldable means submerged in the liquid fuel which will readily yield when a pressure wave strikes it, thus at least partially neutralizing the resulting high pressure which might otherwise rupture the metal of the tank. It is highly desirable that the yieldable pressure-absorbing means be arranged at various locations throughout the liquid in the tank in order to be the most effective. In other words, a yieldable chamber at one end of the tank, for example, might not afford any appreciable protection adjacent the other end of the tank, because the rupture might occur before the pressure wave could reach the protection device at the other end of the tank. This is evidenced by the fact that, even in a partially filled tank, the air above the level of the fuel does not always afford protection against rupture of the tank near the bottom.

While several forms of the invention have been disclosed in detail, together with modifications and variations thereof, it is to be understood that other specific forms may be employed within the spirit and scope of the invention, as defined by the appended claims.

What is claimed is:

1. In combination, a liquid fuel tank comprising a thin-walled metal shell for holding the fuel, and means wholly within the shell for absorbing excessive transient pressures of a magnitude tending to burst the shell, said means comprising a plurality of hollow bodies distributed in different regions of the shell and having walls designed to flex when subjected to such pressures thereby minimizing the tendency of the shell to burst under said pressures.

2. In combination, a self-sealing liquid fuel tank comprising a thin-walled rigid shell for holding the liquid fuel, a plurality of individually-acting gas-containing sealed chambers of resilient material distributed at widely spaced points within the shell and designed to absorb abnormal transient excessive pressure within said tank tending to burst the same.

3. In combination, a liquid containing tank comprising a thin-walled rigid shell for holding the liquid, and individually-acting yieldable gas-filled hermetically sealed means disposed at numerous widely spaced locations within the tank for absorbing excessive transient pressures of a magnitude tending to burst said shell, such pressures, for example, as are produced by the pressure waves propagated in the liquid by a high velocity object deforming or penetrating any part of the shell wall directly opposite a column of the liquid contained thereby, and means for holding said yieldable means submerged in the liquid of said tank.

4. In combination, a liquid-containing tank comprising a thin-walled rigid shell for holding the liquid, said tank having a baffle therein, a gas-containing body of elastic material for absorbing transient excessive pressures of a magnitude tending to burst said shell, and means for supporting said body on said baffle within the tank and submerged in the liquid thereof.

5. In combination, a liquid fuel tank comprising a thin-walled metal shell for holding the fuel, and collapsible means within the shell and at least partly immersed in the liquid fuel therein, said means being resistant to collapse under the normal pressure of said liquid fuel but designed to collapse under, and thereby absorb, excessive pressures, such, for example, as are due to pressure waves propagated in the liquid fuel by high velocity objects deforming or penetrating the shell wall, said means being so distributed as to occupy widely different regions of the shell thereby minimizing the tendency of the shell to burst under such pressure waves irrespective of their point of origin.

6. The combination according to claim 5 in which the collapsible means comprises an inner lining for the shell enclosing individually sealed gas bubbles.

MICHAEL WATTER.